(12) United States Patent
Sandor, Sr.

(10) Patent No.: US 7,971,546 B1
(45) Date of Patent: Jul. 5, 2011

(54) WATERCRAFT DOCKING SYSTEM

(76) Inventor: Frederick J. Sandor, Sr., Satellite Beach, FL (US)

( * ) Notice: Subject to any disclaimer, the term of this patent is extended or adjusted under 35 U.S.C. 154(b) by 690 days.

(21) Appl. No.: 12/011,668

(22) Filed: Jan. 30, 2008

(51) Int. Cl.
*B63B 59/02* (2006.01)
*E02B 3/26* (2006.01)

(52) U.S. Cl. ........................................ 114/219; 405/212

(58) Field of Classification Search .............. 114/44–48, 114/219, 220, 230.1, 230.15–230.19, 344; 280/414.1–414.3; 405/212–216
See application file for complete search history.

(56) References Cited

U.S. PATENT DOCUMENTS

| | | | |
|---|---|---|---|
| 3,486,342 A | | 12/1969 | Aks |
| 4,010,962 A | | 3/1977 | Groblebe |
| 4,338,046 A | | 7/1982 | Thomerson |
| 4,529,217 A | * | 7/1985 | Wood .......................... 280/414.1 |
| 4,653,420 A | * | 3/1987 | Johnson ......................... 114/219 |
| 4,715,768 A | * | 12/1987 | Capps .......................... 414/535 |
| 5,184,562 A | | 2/1993 | Hallin |
| 5,518,342 A | | 5/1996 | Wright et al. |
| 6,499,915 B1 | | 12/2002 | Tayman |

OTHER PUBLICATIONS

VE-VE Incorporated, "Roller Guide Ons" brochure, Ramsey MN; Copyright 2001-2005.

* cited by examiner

*Primary Examiner* — Ajay Vasudeva
(74) *Attorney, Agent, or Firm* — Mayback & Hoffman, P.A.; Gregory L. Mayback; Katie M. Blakley

(57) ABSTRACT

In a preferred embodiment, an apparatus for guiding a watercraft, including: at least two center members of relatively hard material; each of the at least two center members having a tube of relatively soft material forced thereover; the tube of relative soft material contacting a rubrail of the watercraft; and no other part of the apparatus contacts any portion of the watercraft.

16 Claims, 4 Drawing Sheets

WATERCRAFT DOCKING SYSTEM

BACKGROUND OF THE INVENTION

1. Field of the Invention

The present invention relates to watercraft generally and, more particularly, but not by way of limitation, to a novel system for docking watercraft.

2. Background Art

Watercraft can be severely damaged while docking in a berth on a floating dock or while docking on a trailer or while docking on a boat lift. Such damage can occur due to wave action, wind, and/or operator error.

Some attempts to limit the damage are as follows:

U.S. Pat. No. 3,486,342, issued Dec. 30, 1969, to Aks, and titled PILE MOORING BUMPER, discloses a pile mooring bumper which is intended to be used with a watercraft tied between two piles.

U.S. Pat. No. 4,010,962, issued Mar. 8, 1977, to Groblebe, and titled BOAT LOADING STRUCTURE, discloses a boat trailer having a pair of side rails with bars extending upwardly from the side rails. Each of the bars has a spring connecting it with a side rail and has a roller member rotatably attached to the upper end thereof.

U.S. Pat. No. 4,338,046, issued Jul. 6, 1982, to Thomerson, and titled BUMPER RING WITH RELIEF GROOVE, discloses a system for protecting the legs of an offshore platform which includes a bumper system having its upper and lower ends attached to the platform.

U.S. Pat. No. 4,653,420, issued Mar. 31, 1987, to Johnson, and titled PROTECTIVE COVER FOR BOAT HOIST BUMPERS, discloses two or four bumpers attached to a lift for boats. Each bumper is covered with a protective composite sleeve, the bumpers constructed usually of foamed polystyrene. Each bumper is flared outwardly to conform to the side of the boat.

U.S. Pat. No. 5,184,562, issued Feb. 9, 1993, to Hallin, and titled LAKE DOCK POLE ACCESSORY SYSTEM, discloses a plurality of vertical bumpers attached to a lake dock, the bumpers being provided for the tying up of a watercraft thereto. Each bumper has a protective central portion of wood.

U.S. Pat. No. 5,518,342, issued May 21, 1996, to Wright et al., and titled MARINE DOCK BUMPER AND TIE LINE STORAGE DEVICE, discloses a vertical dock bumper which, in pertinent part, includes a padded section of desirably a blown closed cell polyurethane foam with a formed skin.

U.S. Pat. No. 6,499,915, issued Dec. 31, 2002, to Tayman, and titled PORTABLE PILING EXTENDER APPARATUS, discloses a vertical piling extender, the extender to prevent the rub rail of a boat from riding over the top of the piling.

Brochure by Ve-Ve Incorporated, Ramsey, Minn., copyright 2001-2005, shows various types of roller guide ons for watercraft.

The prior art disclosed above has some serious disadvantages. First, some of the bumpers use a relatively soft center member. Second, some are designed to contact the watercraft below the rubrail of the watercraft, thus tending to mar the topsides. Third, some are complicated structures. Fourth, some are not self-draining.

Accordingly, it is a principal object of the present invention to provide a system for watercraft docking that does not have a relatively soft center member.

It is a further object on the present invention to provide such a system for watercraft docking that contacts only the rubrail of the watercraft, thus not marring the topsides of the watercraft.

It is another object of the present invention to provide such a system that is simply constructed.

It is an additional object of the present invention to provide such a system that is self-draining.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others by providing, in a preferred embodiment, an apparatus for guiding a watercraft, comprising: at least two center members of relatively hard material; each of said two center members having a tube of relatively soft material forced thereover; said tube of relative soft material contacting a rubrail of said watercraft; and no other part of said apparatus contacts any portion of said watercraft.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
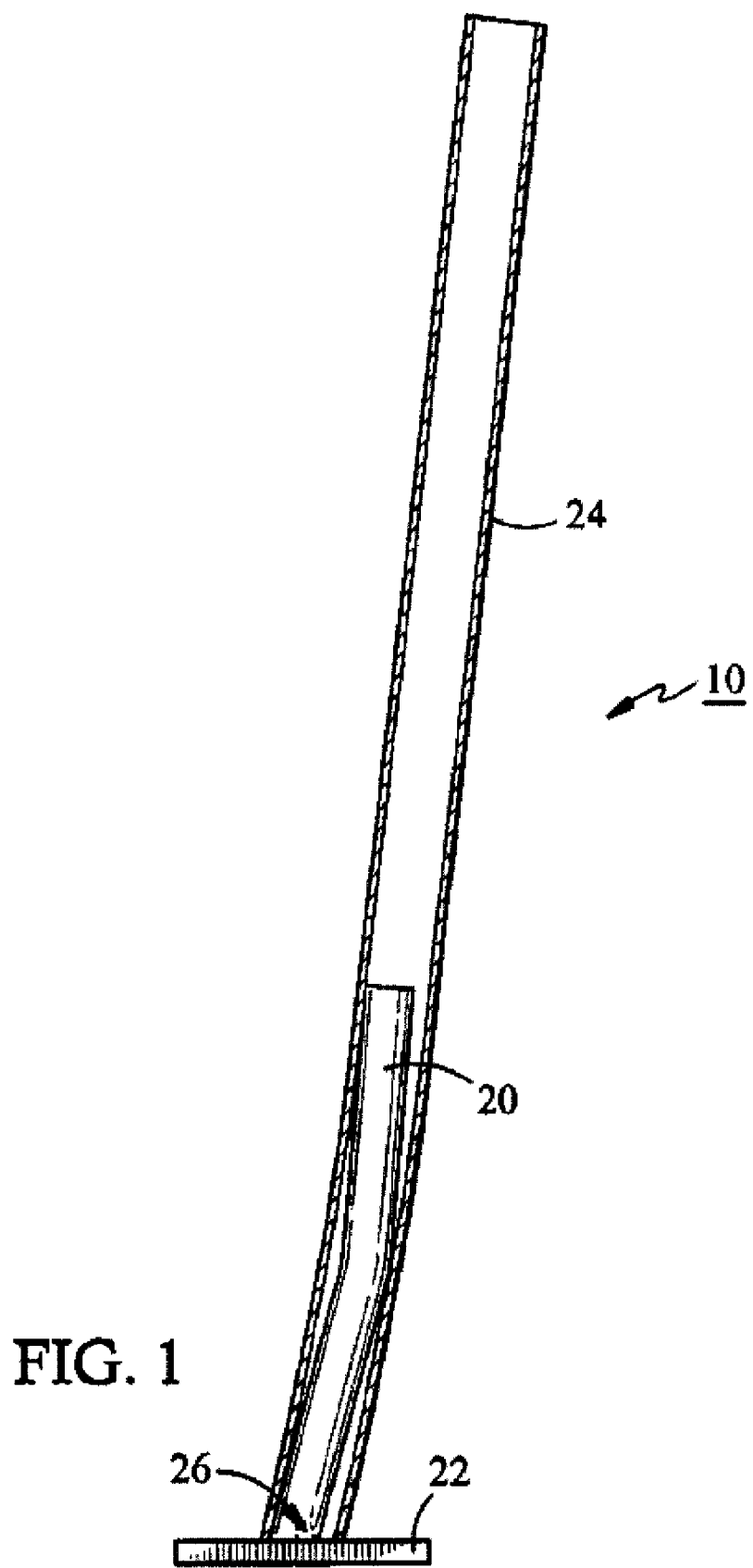
FIG. 1 is a side elevational view, partially in cross-section of the unit of the present invention.

The invention consists of an apparatus for fending off or centering watercraft on boat trailers, docks, dry storage, etc. A metal plate is bent and fastened to a base mounting flange which is secured to a watercraft trailer, watercraft lift, or whatever. Then, a PVC/plastic pipe of adequate thickness is forced down over the bent pipe to the base plate. The plastic tube is now capable of resisting high side loads and acts as a spring to help guide the watercraft to its proper location. As a force pushes on the composite tube, it yields and responds with increasing response to redirect the watercraft to the proper location. As one approaches the trailer lift and makes contact with the system, the non-marring plastic tube will yield and push back to guide the vessel to the predetermined desired location, permitting single-handed docking if desired. The composite columns can be kept loose or tight to the hull as required. The dimensions of the elements can be varied depending on the size of the watercraft.

Reference should now be made to the drawing figures, provided for purposes of illustration only, and on which the figure numerals in parentheses (when used) refer the reader to the figure in which the element(s) being described are more fully shown, although the element(s) may be shown on other figures also.

FIG. 1 illustrates a unit constructed according to the present invention, generally indicated by the reference numeral 10. Unit 10 includes a relatively hard center pipe or bar 20, preferably of metal, attached to a baseplate 22 over which center pipe or bar is forced a PVC or other plastic pipe 24. Center pipe or bar 20 is preferably about 1½ inches in diameter and is about 12-20 inches long, with a generally vertical upper half and a lower half bent about 8-10 degrees from vertical. PVC or other plastic pipe 24 is preferably about 2 inches in diameter and is about 3 to 4 feet long. Of course, center pipe or bar 20 and PVC or other plastic tube 24 can have other dimensions, depending on the size of the watercraft. Drain hole 26 is disposed at the lowest end of PVC or other plastic pipe 24.

Figure 2:
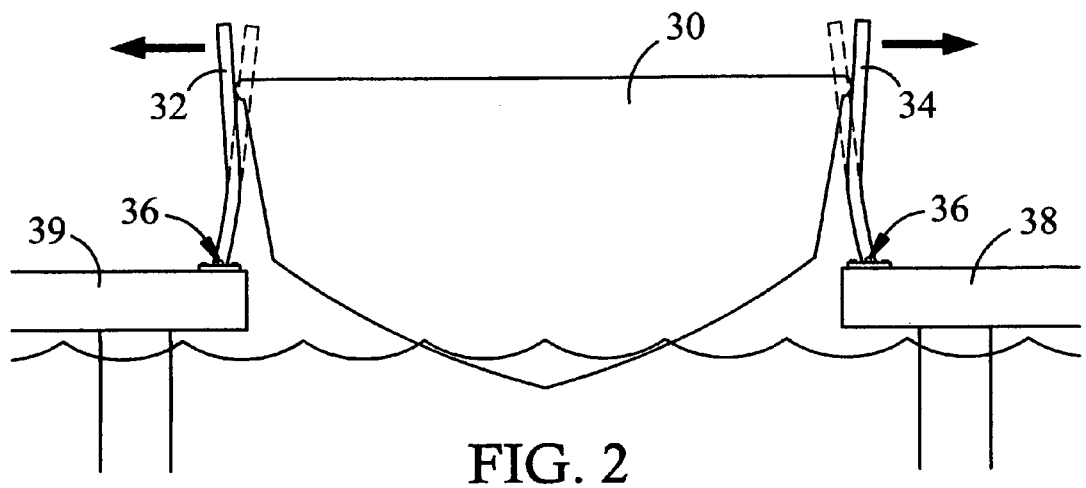
FIG. 2 is a end elevational view, showing the tubing of the present invention being flexed and centering a watercraft.

FIG. 2 illustrates a watercraft 30 being guided by units 32 and 34, the units being attached, respectively, to docks 39 and 38 disposed on either side of watercraft 30. The initial position of units 32 and 34 is shown in broken lines on FIG. 2. When watercraft 30 approaches docks 39 and 38, the plastic tubes of units 32 and 34 contact the rubrail of the watercraft and flex outwardly in the direction indicated by the heavy arrows on FIG. 2, thus guiding watercraft 30 to its proper position between the docks and counteracting any forces due to wave action, wind, and/or operator error. Drain holes 36 are provided at the lowest end if plastic tubes 32 and 34.

Figure 3:
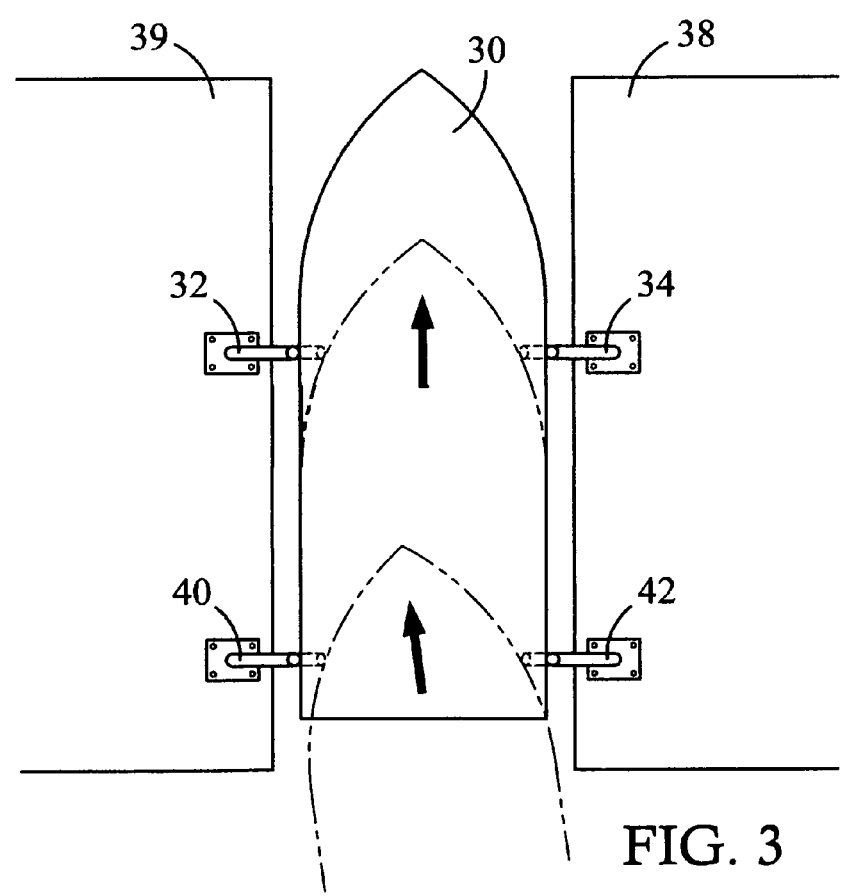
FIG. 3 is a top plan view of the arrangement of FIG. 2.

FIG. 3 illustrates watercraft 30 being guided into position by units 32 and 34 and also illustrates that the provision of four units is desirable, the additional units being indicated by the reference numerals 40 and 42.

Figure 4:
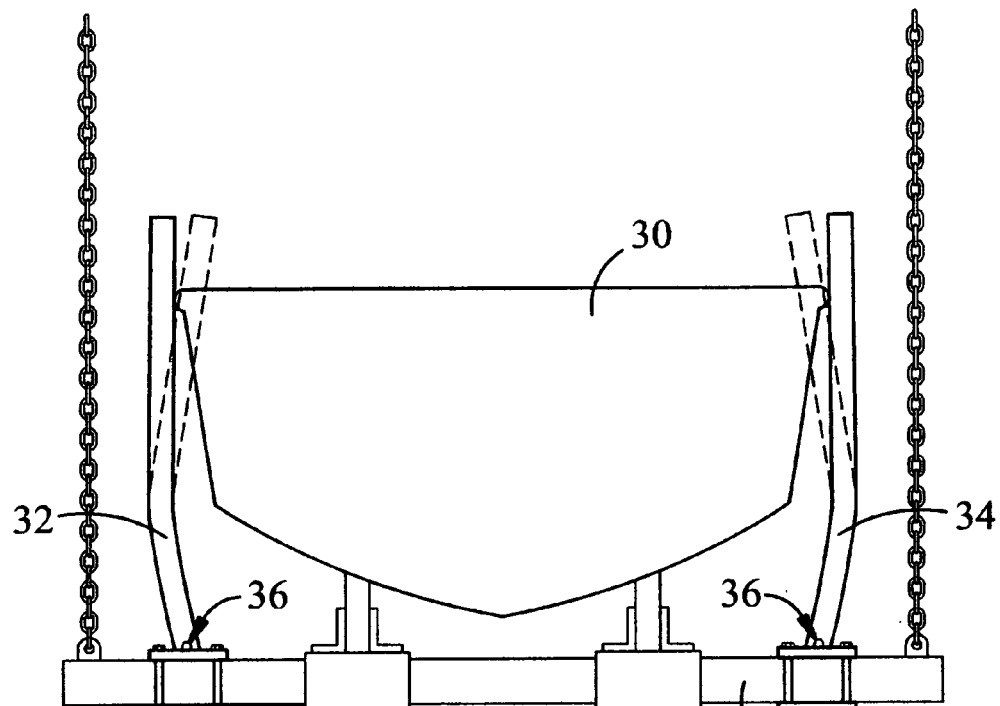
FIG. 4 is an end elevational view of the units attached to the horizontal cross beam of a watercraft lift.

FIG. 4 illustrates a watercraft 30 guided onto a watercraft lift by units 32 and 34. Units 32 and 34 are mounted on a horizontal cross beam 50 of the watercraft lift in a direction opposite to that shown on FIG. 2. It will be understood that units 40 and 42 (FIG. 3) may be provided and that the procedure outlined with reference to FIGS. 2 and 3 will be followed to guide watercraft onto the watercraft lift. Various other means of attachment of units 32 and 34 to horizontal cross beam 50 may be provided as well and such is within the contemplation of the present invention. Drain holes 36 are shown disposed at the lowest ends of tubes 32 and 34.

Figure 5:
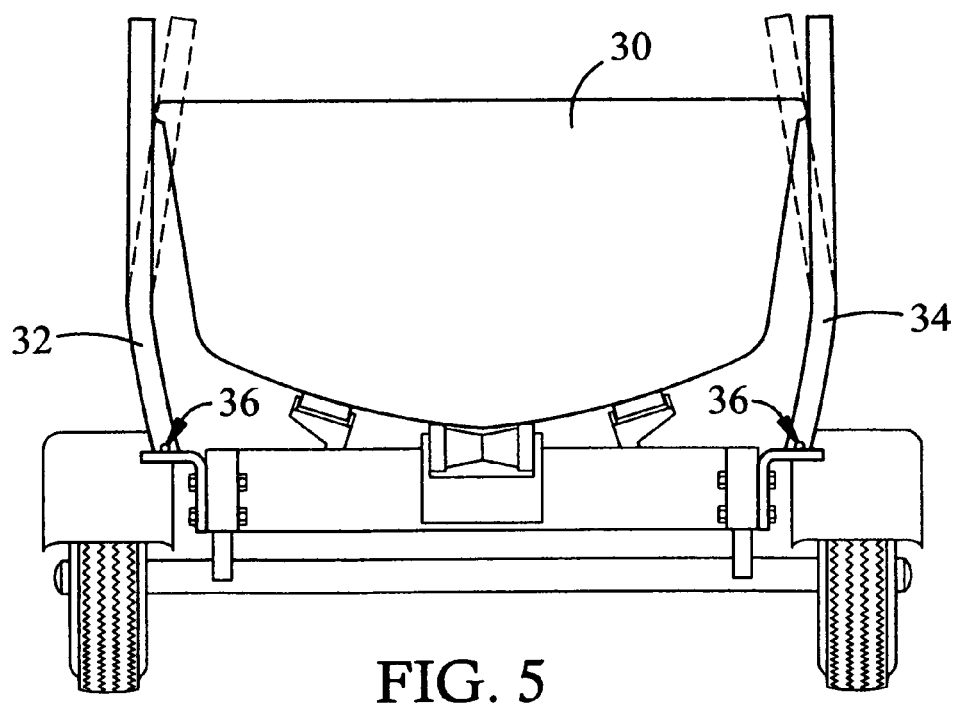
FIG. 5 is an end elevational view of the units attached to a horizontal member of a watercraft trailer.

FIG. 5 illustrates a watercraft 30 guided onto a watercraft trailer by units 32 and 34. Units 32 and 34 are mounted on a horizontal cross member 60 of the watercraft lift in a direction opposite to that shown on FIG. 2. It will be understood that units 40 and 42 (FIG. 3) may be provided and that the procedure outlined with reference to FIGS. 2 and 3 will be followed to guide watercraft 30 onto the watercraft trailer. Various other means of attachment of units 32 and 34 to horizontal cross member may be provided as well and such is within the contemplation of the present invention. Drain holes 36 are shown disposed at the lowest ends of tubes 32 and 34.

Figure 6A:
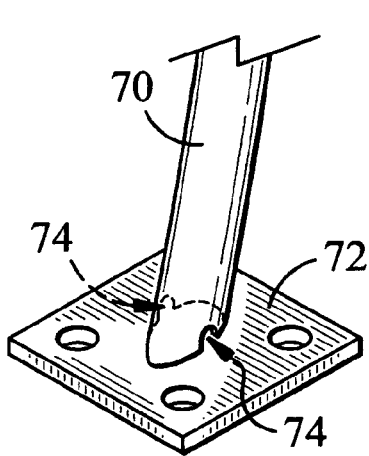
FIGS. 6a and 6b are fragmentary isometric views showing, respectively, single and double (for sandwiching) mounting plates for a horizontal surface.
Figure 6B:
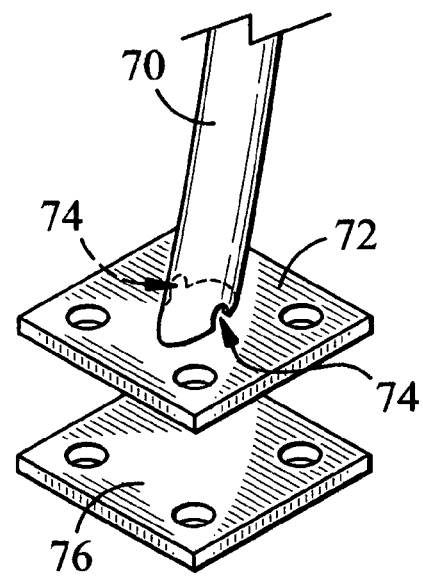

FIGS. 6a and 6b illustrate center pipe or bar 70 attached, respectively, to a horizontal mounting plate 72, the latter figure including a backing plate 76 for sandwiching between horizontal surfaces. When element 70 is a pipe, drain holes 74 are disposed at the lowest ends of the pipes.

Figure 7A:
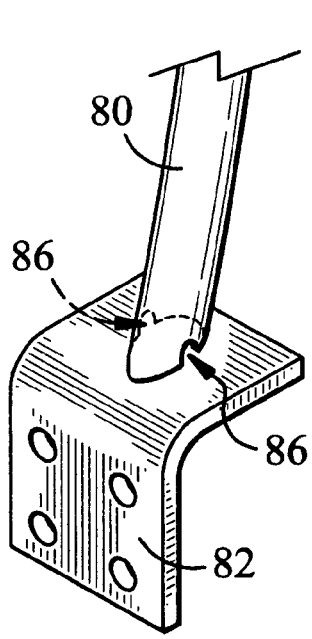
FIGS. 7a and 7b are fragmentary isometric views showing, respectively, single and double (for sandwiching) mounting plates for a vertical surface.
Figure 7B:
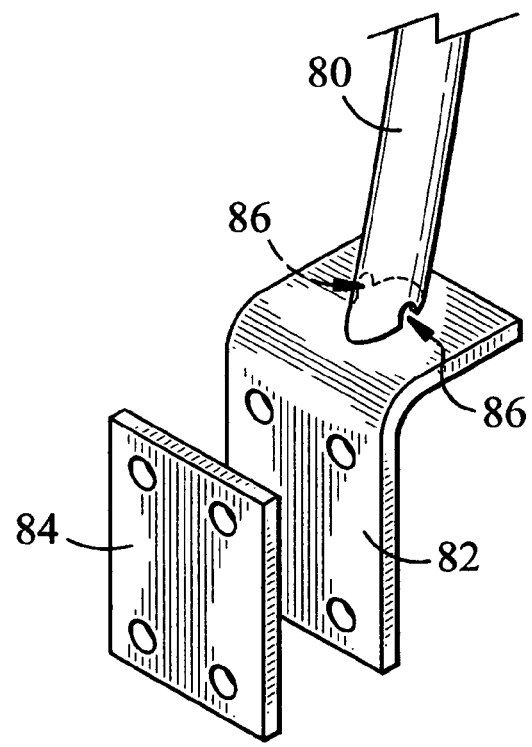

FIGS. 7a and 7b illustrate center pipe or bar 80 attached, respectively, to a vertical mounting plate 82, the latter figure including a backing plate 84 for sandwiching between vertical surfaces. When element 80 is a pipe, drain holes 86 are disposed at the lowest ends of the pipes.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An apparatus for guiding a watercraft comprising:
   at least two substantially flexible tubes, each about 2 inches in diameter and about 3 to 4 feet in length;
   at least two substantially nonflexible center members about 1½ inches in diameter and about 12-20 inches in length, each center member having a generally vertical upper half and a lower half bent about 8-10 degrees from said upper half and each center member being inserted within one of said at least two substantially flexible tubes; and
   at least two baseplates each fixedly coupled to a watercraft storage device and one of said at least two substantially nonflexible center members, each of said at least two baseplates supporting one of said at least two substantially nonflexible center members at an angle, wherein said angle positions said tubes so that only a rubrail of a watercraft is able to contact said at least two substantially flexible tubes at a same time and substantially only said substantially flexible tubes flex when a watercraft comes into contact with said apparatus.

2. Apparatus, as defined in claim 1, wherein said watercraft storage device is at least one of:
   a dock disposed on either side of said watercraft;
   a watercraft lift; and
   a watercraft trailer.

3. Apparatus, as defined in claim 1, wherein: said substantially flexible tubes are formed from one of PVC and a PVC-like plastic.

4. Apparatus, as defined in claim 1, wherein: each of said substantially flexible tubes is frictionally pressed onto one of said at least two substantially nonflexible center members.

5. An apparatus for guiding a watercraft comprising:
   at least two substantially flexible tubes, each tube having a first length of between about 3 and 4 feet;
   at least two substantially nonflexible center members, each center member being inserted within one of said at least two substantially flexible tubes, each center member having a second length of between about 12 and 20 inches, each center member further having a lower half and a generally vertical upper half, the lower and upper halves defining a substantial bend therebetween; and at least two baseplates each fixedly coupled to a watercraft storage device and one of said at least two substantially nonflexible center members, each of said at least two baseplates supporting one of said at least two substantially nonflexible center members so that only a rubrail of a watercraft is able to contact said at least two substantially flexible tubes at the same time.

6. Apparatus, as defined in claim 5, wherein said watercraft storage device is at least one of:
- a dock disposed on either side of said watercraft;
- a watercraft lift; and
- a watercraft trailer.

7. Apparatus, as defined in claim 5, wherein: said substantially flexible tubes are formed from one of PVC and a PVC-like plastic.

8. Apparatus, as defined in claim 5, wherein: each of said at least two substantially nonflexible center members is about 1½ inches in diameter and each of said substantially flexible tubes is about 2 inches in diameter.

9. Apparatus, as defined in claim 5, wherein: each of said substantially flexible tubes is frictionally pressed onto one of said at least two substantially nonflexible center members.

10. Apparatus, as defined in claim 5, wherein: the substantial bend is defined by the lower half being bent about 8 to 10 degrees from a longitudinal axis of the upper half.

11. An apparatus for guiding a watercraft comprising:
- at least two substantially flexible tubes, each tube having a first length;
- at least two substantially nonflexible center members, each center member being inserted within one of said at least two substantially flexible tubes, each center member having a second length that is substantially shorter than the first length, each center member further having a generally vertical upper half and a lower half bent about 8 to 10 degrees from the upper half; and
- at least two baseplates each fixedly coupled to a watercraft storage device and one of said at least two substantially nonflexible center members, each of said at least two baseplates supporting one of said at least two substantially nonflexible center members so that only a rubrail of a watercraft is able to contact said at least two substantially flexible tubes at the same time.

12. Apparatus, as defined in claim 11, wherein said watercraft storage device is at least one of:
- a dock disposed on either side of said watercraft;
- a watercraft lift; and
- a watercraft trailer.

13. Apparatus, as defined in claim 11, wherein: said substantially flexible tubes are formed from one of PVC and a PVC-like plastic.

14. Apparatus, as defined in claim 11, wherein: each of said at least two substantially nonflexible center members is about 1½ inches in diameter and each of said substantially flexible tubes is about 2 inches in diameter.

15. Apparatus, as defined in claim 11, wherein: each of said substantially flexible tubes is frictionally pressed onto one of said at least two substantially nonflexible center members.

16. Apparatus, as defined in claim 11, wherein the first length is between about 3 and 4 feet and the second length is between about 12 and 20 inches.

* * * * *